(12) United States Patent
Rosner et al.

(10) Patent No.: US 7,247,836 B2
(45) Date of Patent: Jul. 24, 2007

(54) METHOD AND SYSTEM FOR DETERMINING MOTION BASED ON DIFFERENCE IMAGE CORRELATION

(75) Inventors: S. Jeffrey Rosner, Palo Alto, CA (US); Geraint Owen, Palo Alto, CA (US); George M. Clifford, Jr., Los Altos Hills, CA (US)

(73) Assignee: Micron Technology, Inc., Boise, ID (US)

( * ) Notice: Subject to any disclaimer, the term of this patent is extended or adjusted under 35 U.S.C. 154(b) by 138 days.

(21) Appl. No.: 11/014,482

(22) Filed: Dec. 16, 2004

(65) Prior Publication Data

US 2006/0131485 A1   Jun. 22, 2006

(51) Int. Cl.
*G09G 5/08* (2006.01)
(52) U.S. Cl. .................. 250/226; 250/557; 250/221
(58) Field of Classification Search .............. 250/557, 250/221, 226; 382/312, 313, 314, 315, 316, 382/321, 322, 323; 345/156, 157, 158, 163, 345/164, 165, 166
See application file for complete search history.

(56) References Cited

U.S. PATENT DOCUMENTS 5,994,710 A * 11/1999 Knee ..................... 250/557

OTHER PUBLICATIONS

International Search Report Appln. No. PCT/US05/39493 dated Nov. 22, 2006.

* cited by examiner

*Primary Examiner*—Thanh X. Luu
*Assistant Examiner*—Tony Ko
(74) *Attorney, Agent, or Firm*—RatnerPrestia

(57) ABSTRACT

An imager captures successive images of an object. One image is then subtracted from another image to generate difference images. Each difference image is then correlated with itself or with one of the images used to generate the difference image to determine the relative motion between the imager an the object.

11 Claims, 4 Drawing Sheets

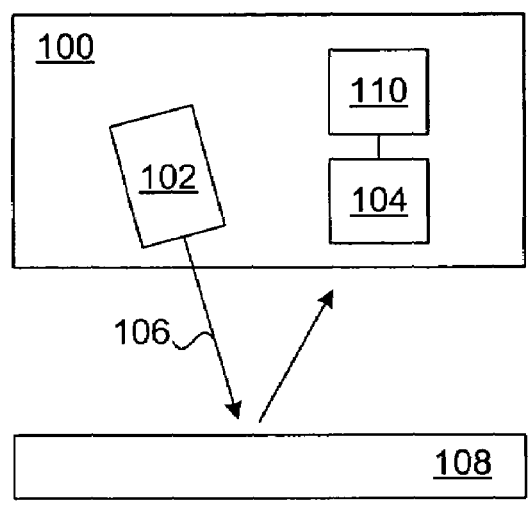
FIG. 1 – PRIOR ART
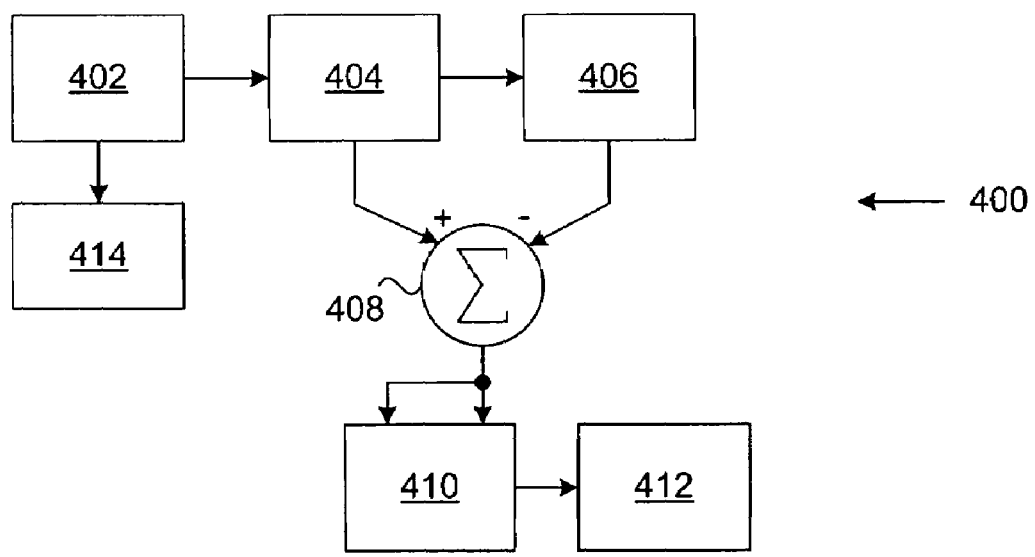
FIG. 4

METHOD AND SYSTEM FOR DETERMINING MOTION BASED ON DIFFERENCE IMAGE CORRELATION

BACKGROUND

Navigational devices have been used with computers and other types of computing systems for many years. A computer mouse is one example of a navigation device. With a mechanical computer mouse, a ball rolls over a mouse pad as the mouse is moved. Interior to the mouse are wheels that contact the ball and covert its rotation into electrical signals representing orthogonal components of motion.

Another type of computer mouse is an optical mouse. FIG. 1 is a diagrammatic illustration of a portion of an optical mouse according to the prior art. Mouse 100 includes light source 102 and imager 104. Light source 102 is typically implemented as a light-emitting diode, which emits light 106 towards surface 108. Imager 104 captures images from surface 108 and transmits the images to processing circuit 110. Processing circuit 110 typically correlates the images in order to track the motion of objects in the images and determine the speed and distance mouse 100 has moved across surface 108.

Contamination in the optical path between surface 108 and imager 104 can reduce the ability of processing circuit 110 to determine motion. Contamination such as dust, lint, and condensation appear as background noise that remains relatively constant from image to image and reduces the efficiency of the correlation engine. If the contamination increases over time, the background noise may cause the correlation engine to produce signals that overwhelm the other signals and cause processing circuit 110 to erroneously conclude optical mouse 100 is not moving.

SUMMARY

In accordance with the invention, a method and system for determining motion based on difference image correlation are provided. An imager captures successive images of an object. One image is then subtracted from another image to generate difference images. Each difference image is then correlated with itself or with one of the images used to generate the difference image to determine the relative motion between the imager and the object.

BRIEF DESCRIPTION OF THE DRAWINGS

The invention will best be understood by reference to the following detailed description of embodiments in accordance with the invention when read in conjunction with the accompanying drawings, wherein:

FIG. 1 is a diagrammatic illustration of a portion of an optical mouse in accordance with the prior art;

FIG. 4 is a block diagram of a system for implementing the method of FIG. 2 in an embodiment in accordance with the invention.

DETAILED DESCRIPTION

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 2:
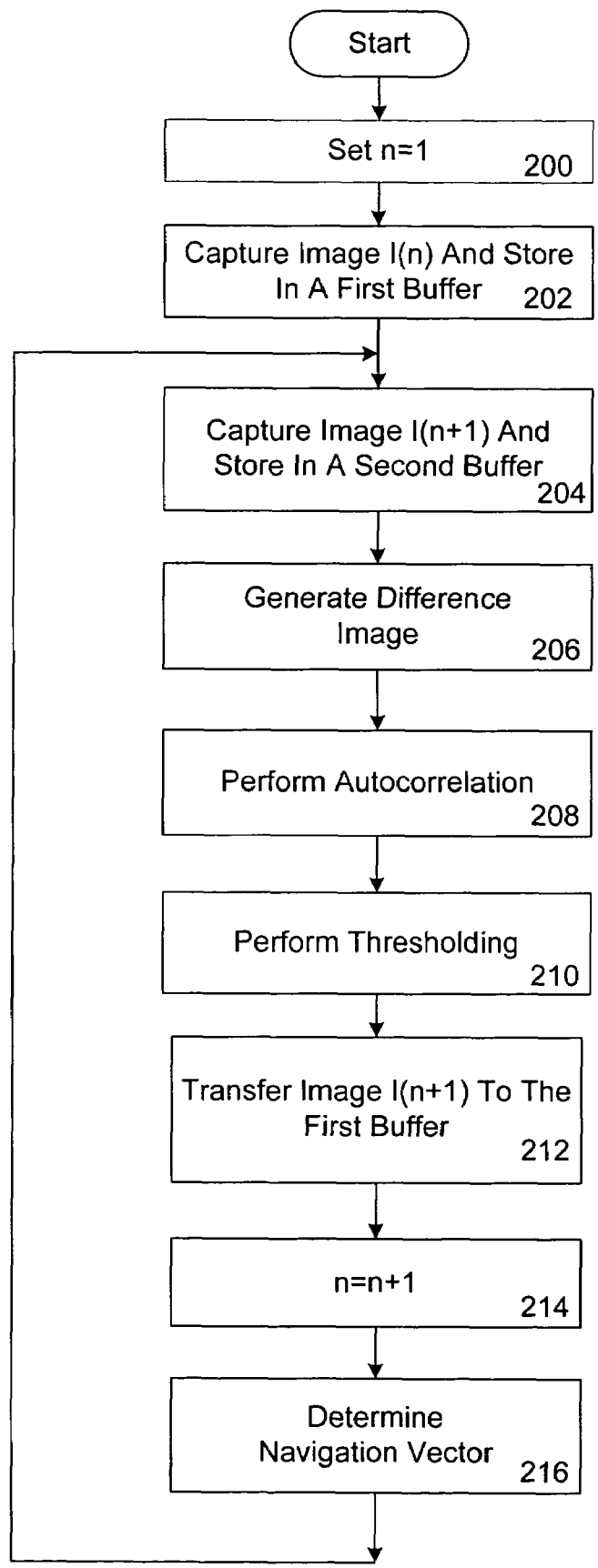
FIG. 2 illustrates a flowchart of a first method for determining motion based on difference image correlation in an embodiment in accordance with the invention.

With reference to the figures and in particular with reference to FIG. 2, there is shown a flowchart of a first method for determining a navigation vector based on difference image correlation in an embodiment in accordance with the invention. Initially a number n is set to 1 and an image of an object (image I(n)) is captured by an imager (blocks 200, 202). Image I(n) is then stored in a buffer. In an embodiment in accordance with the invention, image I(n) is stored in the first buffer of two buffers connected in series.

Next, at block 204 image I(n+1) is captured by the imager and stored in another buffer. In an embodiment in accordance with the invention, image I(n+1) is stored in the last buffer of the two buffers in series. Thus, the two buffers connected in series form a queue in which the images shift from one buffer to the other as the images are captured and processed. This shifting occurs electronically by transferring data to the first buffer in an embodiment in accordance with device the invention. In another embodiment in accordance with the invention, the shift occurs logically by reassigning pointers or addresses to the buffers.

Image I(n) is then subtracted from image I(n+1) at block 206 in order to generate a difference image. The grayscale values from image I(n) are subtracted from the grayscale values in image I(n+1). Thus, the difference image represents the difference in grayscale values between the two images. Subtracting one image from the other image reduces or eliminates the background noise that is constant or nearly constant in the two images. Reducing or eliminating the background noise increases the signal to noise ratio and improves the effectiveness of motion detection.

An autocorrelation is then performed with the difference image, as shown in block 208. Thresholding is performed on the autocorrelation result to confirm whether motion occurred between the times image I(n) and image I(n+1) were captured (block 210). Next, at block 212 image I(n+1) is transferred to the first buffer in an embodiment in accordance with the invention. In another embodiment in accordance with the invention, the shift occurs logically by reassigning pointers or addresses to the buffers.

The number n is then incremented by one (block 214) and a navigation vector determined from the autocorrelation result (block 216). The navigation vector is a measure of the relative motion of the object. The "relative motion" is the motion between the imager and the object. In one embodiment in accordance with the invention, the imager is included in a device such as an optical navigation device and the imager moves while the object remains stationary. In another embodiment in accordance with the invention, the object is moving while the imager remains stationary. And in yet another embodiment in accordance with the invention, both the imager and the object move relative to each other.

The navigation vector is defined as a vector from the origin to the maximum of the autocorrelation result in an embodiment in accordance with the invention. This maximum may be computed by choosing the pixel with the largest value, by fitting a pre-determined shape to the region of the largest value pixel to interpolate and find a more accurate determination, or by other mathematical methods for finding maxima locations in a sampled image. If a maximum is found only at the origin, a zero motion vector is reported.

In the embodiment of FIG. 2, the navigation vector is determined with an ambiguity in the sign (±) of the vector. This is a result of performing the autocorrelation at block 208. The process then returns to block 204 and continuously repeats in an embodiment in accordance with the invention. In other embodiments in accordance with the invention, the relative motion is not determined with an iterative method. For example, a navigation vector is determined when a request is received or when a triggering event occurs in other embodiments in accordance with the invention.

Figure 3:
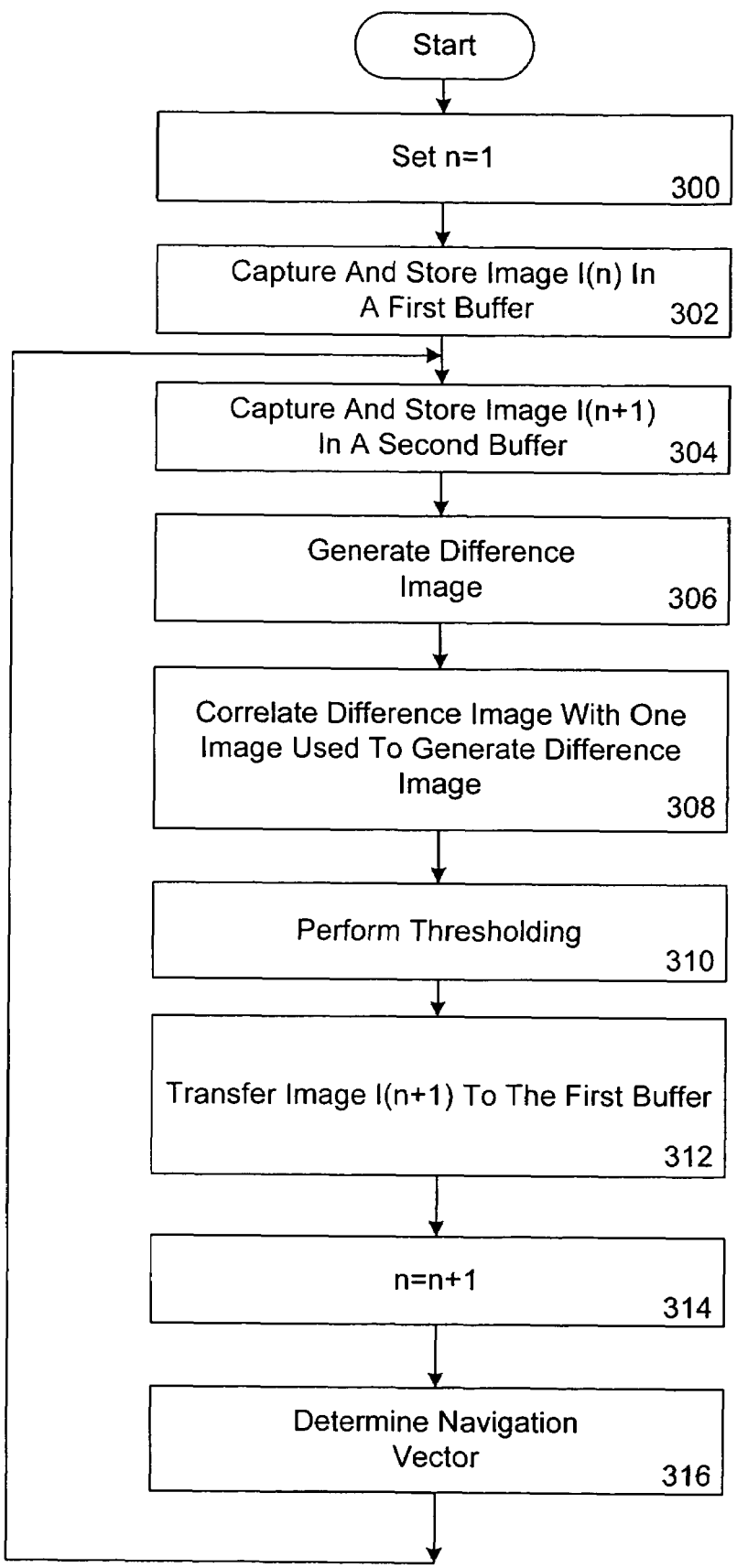
FIG. 3 depicts a flowchart of a second method for determining motion based on difference image correlation in an embodiment in accordance with the invention.

FIG. 3 depicts a flowchart of a second method for determining motion based on difference image correlation in an embodiment in accordance with the invention. A number n is set to 1 and an image of an object is captured by an imager (blocks 300, 302). The image, image I(n), is then stored in a buffer. In an embodiment in accordance with the invention, image I(n) is stored in the first of two buffers connected in series.

Next, at block 304, image I(n+1) is captured and stored in another buffer. In an embodiment in accordance with the invention, image I(n+1) is stored in the last buffer of the two buffers in series. Thus, the two buffers connected in series form a queue in which the images shift from one buffer to the other as the images are captured and processed. This shifting occurs electronically by transferring data to the first buffer in an embodiment in accordance with the invention. In another embodiment in accordance with the invention, the shift occurs logically by reassigning pointers or addresses to the buffers.

A difference image is generated at block 306 by subtracting image I(n) from image I(n+1). The grayscale values from image I(n) are subtracted from the grayscale values in image I(n+1). Thus, the difference image represents the difference in grayscale values between the two images.

The difference image is then correlated with one of the images used to create the difference image (block 308). For example, in one embodiment in accordance with the invention, the difference image is correlated with image I(n). In another embodiment in accordance with the invention, the difference image is correlated with image I(n+1).

Thresholding is then performed on the correlation result to confirm motion occurred between the time image I(n) and image I(n+1) were captured (block 310). Next, at block 312, image I(n+1) is transferred to the first buffer in an embodiment in accordance with the invention. In another embodiment in accordance with the invention, the shift occurs logically by reassigning pointers or addresses to the buffers.

The number n is then incremented by one at block 314 and a navigation vector calculated at block 316 using methods similar to the ones described in conjunction with the embodiment of FIG. 2. In the embodiment of FIG. 3, the navigation vector is a measure of both the magnitude and direction of the relative motion with no sign ambiguity. The process then returns to block 304. The method shown in FIG. 3 is iterative and repeats continuously. In other embodiments in accordance with the invention, a method for determining a navigation vector based on difference image. correlation is not an iterative method.

Referring now to FIG. 4, there is shown a block diagram of a system for implementing the method of FIG. 2 in an embodiment in accordance with the invention. System 400 includes imager 402 and buffers 404, 406. Imager 402 captures an image of an object and transmits the image (image I(n)) to buffer 404. Imager 402 then captures the next image, image I(n+1). Image I(n+1) is transmitted and stored in buffer 404 after image I(n) is transmitted from buffer 404 and stored in buffer 406. In another embodiment in accordance with the invention, image I(n) is stored in buffer 406 prior to capturing image I(n+1). And in yet another embodiment in accordance with the invention, the shift occurs logically by reassigning pointers or addresses to the buffers.

The images are then input into difference image generator 408 in order to generate a difference image. In an embodiment in accordance with the invention, difference image generator 408 is implemented with a summing circuit. Correlator 410 performs an autocorrelation with the difference image and transmits the results to processing circuit 412. Processing circuit 412 then performs a thresholding operation on the autocorrelation result and determines the relative motion based on the autocorrelation result.

In an embodiment in accordance with the invention, imager 402 is implemented with a complementary metal oxide semiconductor (CMOS) imager and system 400 with a field programmable gate array (FPGA). In other embodiments in accordance with the invention, imager may be implemented with another type of image capture device. System 400 may also be implemented differently, such as, for example, with discrete components.

Clock 414 is connected to imager 402 in an embodiment in accordance with the invention. Clock 414 permits imager 402 to capture and transmit the images to buffers 404, 406 synchronously. This allows system 400 to determine an absolute magnitude reference in an embodiment in accordance with the invention. In other embodiments in accordance with the invention, clock 414 may not be included in system 400.

Figure 5:
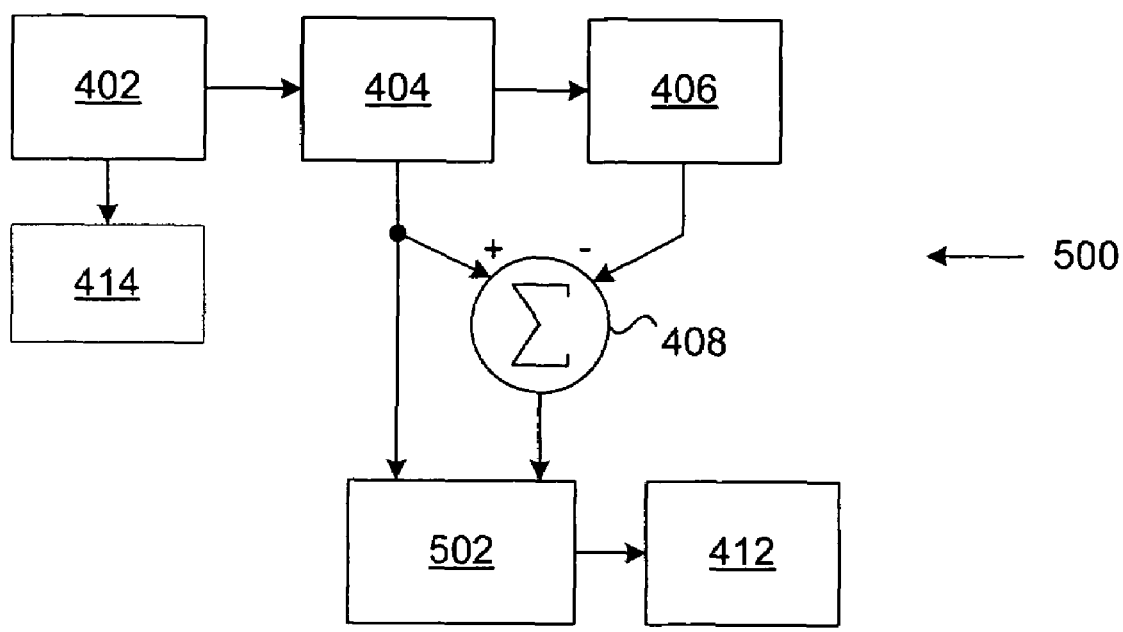
FIG. 5 is a block diagram of a first system for implementing the method of FIG. 3 in an embodiment in accordance with the invention.

FIG. 5 is a block diagram of a system for implementing the method of FIG. 3 in an embodiment in accordance with the invention. System 500 may be implemented, for example, with a field programmable gate array (FPGA). Imager 402 captures an image of an object and transmits the image (image I(n)) to buffer 404. Imager 402 then captures the next image, image I(n+1). Image I(n+1) is transmitted and stored in buffer 404 after image I(n) is transmitted from buffer 404 and stored in buffer 406. In another embodiment in accordance with the invention, image I(n) is stored in buffer 406 prior to capturing image I(n+1). And in yet another embodiment in accordance with the invention, the shift occurs logically by reassigning pointers or addresses to the buffers.

The images are then input into difference image generator 408 in order to generate a difference image. The difference image and one of the images used to create the difference image are correlated by correlator 502. In the embodiment of FIG. 5, image I(n+1) which is stored in buffer 404 is correlated with the difference image. In another embodiment in accordance with the invention, image I(n) in buffer 406 is correlated with the difference image. Processing circuit 412 then performs a thresholding operation on the correlation result and determines the relative motion based on the correlation result.

As with the embodiment of FIG. 4, clock 414 is connected to imager 402 in an embodiment in accordance with the invention. Clock 414 permits imager 402 to capture and transmit the images to buffers 404, 406 synchronously. This allows system 500 to determine an absolute magnitude reference in an embodiment in accordance with the invention. In other embodiments in accordance with the invention, clock 414 may not be included in system 500.

The invention claimed is:

1. A method for determining a navigation vector for a device, comprising:
   capturing a first image of an object;
   capturing a second image of the object;
   subtracting the first image from the second image to generate a difference image;
   performing a correlation using the difference image, wherein the difference image is correlated with one of the first image or the second image; and
   determining the navigation vector from a result of the correlation, wherein the navigation vector represents relative motion between the device and the object.

2. The method of claim 1, wherein generating the difference image comprises subtracting grayscale values in the first image from grayscale values in the second image to generate the difference image.

3. The method of claim 1, further comprising prior to determining the navigation vector, performing a thresholding operation on a result of the correlation.

4. The method of claim 1, further comprising repeatedly:
   capturing a subsequent image;
   subtracting a preceding image from a subsequent image to generate a difference image;
   correlating the difference image with one of the images used to generate the difference image; and
   determining the navigation vector based on a result of the correlation.

5. The method of claim 1, further comprising storing the first image in memory.

6. A system for determining the relative motion of a device, comprising:
   an imager configured to capture a plurality of images;
   a difference image generator electrically coupled to the imager and configured to generate difference images using pairs of captured images; and
   a correlator electrically coupled to the difference image generator and configured to receive each difference image and one of the captured images used to create each difference image and correlate the received captured image with its respective difference image.

7. The system of claim 6, wherein the difference image generator subtracts grayscale values in a first image from grayscale values in a second image for each pair of images to generate the difference images.

8. The system of claim 6, further comprising a processing circuit electrically coupled to an output of the correlator and configured to determine the relative motion of the device based on each result of the correlation.

9. The system of claim 6, further comprising a processing circuit electrically coupled to an output of the correlator and configured to perform a thresholding operation on each result of the correlation.

10. The system of claim 6, further comprising memory electrically coupled to the imager and the difference image generator.

11. The system of claim 6, further comprising a clock electrically coupled to the imager.

* * * * *

UNITED STATES PATENT AND TRADEMARK OFFICE
CERTIFICATE OF CORRECTION

PATENT NO.        : 7,247,836 B2                                              Page 1 of 1
APPLICATION NO.   : 11/014482
DATED             : July 24, 2007
INVENTOR(S)       : Rosner et al.

It is certified that error appears in the above-identified patent and that said Letters Patent is hereby corrected as shown below:

Title page, in field (56), under "U.S. Patent Documents", in column 2, line 1, after "Knee" insert -- et al. --.

Title page, in field (57), under "Abstract", in column 2, line 6, delete "an" and insert -- and --, therefor.

Signed and Sealed this

Thirteenth Day of November, 2007

JON W. DUDAS
*Director of the United States Patent and Trademark Office*